(12) United States Patent
Dewachter et al.

(10) Patent No.: US 8,846,831 B2
(45) Date of Patent: Sep. 30, 2014

(54) PROCESS FOR SUPPLYING CATALYST TO A POLYMERIZATION REACTOR

(75) Inventors: Daan Dewachter, Mechelen (BE); Alain Brusselle, Wilrijk (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 13/812,713

(22) PCT Filed: Jul. 29, 2011

(86) PCT No.: PCT/EP2011/063140
§ 371 (c)(1),
(2), (4) Date: Jan. 28, 2013

(87) PCT Pub. No.: WO2012/013800
PCT Pub. Date: Feb. 2, 2012

(65) Prior Publication Data
US 2013/0125996 A1    May 23, 2013

(30) Foreign Application Priority Data

Jul. 30, 2010 (EP) .................................. 10171369

(51) Int. Cl.
| C08F 2/12 | (2006.01) |
| C08F 2/00 | (2006.01) |
| C08F 10/00 | (2006.01) |
| B01J 8/00 | (2006.01) |
| C08F 210/16 | (2006.01) |
| F03B 17/00 | (2006.01) |
| F04B 53/10 | (2006.01) |
| C08F 4/659 | (2006.01) |

(52) U.S. Cl.
CPC ................. *F03B 17/00* (2013.01); *C08F 10/00* (2013.01); *B01J 8/002* (2013.01); *C08F 210/16* (2013.01); *C08F 4/65916* (2013.01); *B01J 2208/00752* (2013.01); *Y10S 526/919* (2013.01); *Y10S 417/90* (2013.01)
USPC .................. 526/64; 526/88; 526/919; 137/1; 417/536; 417/900

(58) Field of Classification Search
USPC ............ 526/64, 88, 919; 137/1; 417/900, 536
See application file for complete search history.

(56) References Cited

U.S. PATENT DOCUMENTS

| 3,726,845 A | 4/1973 | Nickerson |
| 4,690,804 A | 9/1987 | Rohlfing |
| 5,098,667 A | 3/1992 | Young et al. |

FOREIGN PATENT DOCUMENTS

| CN | 2436677 Y | 6/2001 |
| EP | 1563902 A1 | 8/2005 |

(Continued)

OTHER PUBLICATIONS

Communication Pursuant to Article 94(3) EPC for European Application No. 11 737 965.1, mailed on Apr. 9, 2013 (5 pages).

(Continued)

*Primary Examiner* — Fred M Teskin

(57) ABSTRACT

The present invention relates to a method for feeding metallocene catalyst slurry to an olefin polymerization loop reactor (1) using a positive displacement device (5) positive displacement device comprising a first chamber and a second chamber, each chamber having an inlet and an outlet and each chamber comprising an ball arranged between the walls of said chamber, wherein said chambers are connected to each other by a pump chamber operably connected to a pump, wherein, the difference between the diameter of said ball and the diameter of said chamber is comprised between 5 to 200 times the average particle size (d50) of said catalyst.

7 Claims, 2 Drawing Sheets

(56) References Cited

FOREIGN PATENT DOCUMENTS

| | | | |
|---|---|---|---|
| EP | 2045273 | A1 | 4/2009 |
| WO | 2005/077522 | A1 | 8/2005 |

OTHER PUBLICATIONS

"Diaphragm-Type Process Metering Pump Z", TACMINA Co., Jul. 2006, pp. 1-15 (16 pages).

Office Action issued in Chinese Application No. 201180037565.1 dated Apr. 30, 2014, and English translation thereof (13 pages).

US 8,846,831 B2

PROCESS FOR SUPPLYING CATALYST TO A POLYMERIZATION REACTOR

CROSS-REFERENCE TO RELATED APPLICATIONS

This application claims the benefit of PCT/EP2011/063140, filed Jul. 29, 2011, which claims priority from EP 1017136.1, filed Jul. 30, 2010.

TECHNICAL FIELD OF THE INVENTION

The present invention relates to a method for supplying catalyst slurry to a polymerization reactor using a positive displacement device This invention can advantageously be used in chemical manufacturing, specifically in the polymerization of olefins, particularly ethylene (PE).

BACKGROUND OF THE INVENTION

Polyolefins, such as polyethylene (PE), is synthesized by polymerizing olefin, such as ethylene ($CH_2=CH_2$), monomers. Because it is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Olefin polymerizations are frequently carried out in a loop reactor using monomer, liquid diluent and catalyst, optionally one or more co-monomer(s), and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash vessel, where most of the diluent and unreacted monomers are flashed off and recycled.

After the polymer product is collected from the reactor and the hydrocarbon residues are removed, the polymer product is dried, additives can be added and finally the polymer may be extruded and pelletized.

Polymerization of ethylene involves the polymerization of ethylene monomer in the reactor in the presence of a polymerization catalyst and optionally, if required depending on the used catalyst, an activating agent. Suitable catalysts for the preparation of polyethylene, comprise chromium-type catalysts, Ziegler-Matta catalysts and metallocene catalysts. Typically, the catalyst is used in particulate form.

Several systems have been disclosed which involve the preparation and the supply of catalyst slurry to a polymerization reaction. In general, for preparing catalyst slurry, a mixture of dry solid particulate catalyst and diluent are apportioned in a catalyst mixing vessel and thoroughly mixed. Then such catalyst slurry is typically transferred to a polymerization reactor for contact with the monomer reactants, generally under high pressure conditions.

It is known in the art that for the production of ethylene polymers with suitable properties it is important during polymerization to control reaction conditions, including reaction temperatures, reactant concentration, etc. Polymerization reactions are also sensitive to the quantity and the type of catalyst utilized.

Complications may occur during production of polyolefins, particularly polyethylenes. It is important to control reaction conditions, including reaction temperature and reactant concentrations, to obtain polyolefins with suitable properties. Polymerization reactions may also be sensitive to the quantity and the type of catalyst utilized. Underdosing or failure to supply catalyst lead to an insufficient and uneconomical polymerization process while overdosing of catalyst may lead to dangerous run-away reactions. Generally, incorrect dosing of catalyst may lead to suboptimal reaction conditions and/or to unexpected and sometimes extended downtime of the ethylene polymerization reactor.

Consequently, there remains a need in the art for ensuring that an adequate amount of catalyst is made available for production of polyolefin in order to reduce production costs, control process conditions and/or produce high-yielding, high-quality end-products.

SUMMARY OF THE INVENTION

Surprisingly, the present inventors have found a way to improve polyolefin preparation processes and overcome the above and other problems of the prior art. Accordingly, the present invention relates to a method for feeding metallocene catalyst slurry to an olefin polymerization loop reactor using a positive displacement device comprising a first chamber and a second chamber, each chamber having an inlet and an outlet and each chamber comprising a ball arranged between the walls of said chamber, said chambers being operably connected to each other by a pump chamber, comprising the step of activating the pump, thereby:

a) charging the positive displacement device with catalyst slurry into the pump chamber by aspirating catalyst slurry between the ball and the wall of the first chamber; and b) discharging the catalyst slurry into the loop reactor by displacing catalyst slurry between the ball and the wall of the second chamber, wherein, the difference between the diameter of each of said ball and the diameter of each of said chamber is comprised between 5 to 200 times the average particle size (d50) of said catalyst. In an embodiment, said pump is a piston pump. In a preferred embodiment, said pump is a membrane pump.

The present invention also encompasses the use of a positive displacement device for feeding a metallocene catalyst slurry to an olefin polymerization slurry loop reactor, said positive displacement device comprising a first chamber and a second chamber, each chamber having an inlet and an outlet and each chamber comprising a ball arranged between the walls of said chamber, said chambers being operably connected to each other by a pump chamber, wherein, the difference between the diameter of said ball and the diameter of said chamber is comprised between 5 to 200 times the average particle size (d50) of said catalyst.

Surprisingly, the present inventors have found that the invention leads to lower production costs, better controlled process conditions and/or more optimal end-products. The present inventors have found that the invention provides benefits over time with less, failure and/or blockage of the pump when using metallocene catalyst, less wear, shorter downtime, more optimal products and lower production costs. In particular, the present inventors have surprisingly found that the positive displacement device of the invention allows for precise and well-controlled dosing over time of abrasive metallocene catalyst slurry, in particular of metallocene catalyst on a porous silica support.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. The reference numbers relate to the hereto-annexed figures.

DETAILED DESCRIPTION OF INVENTION

Figure 1A:
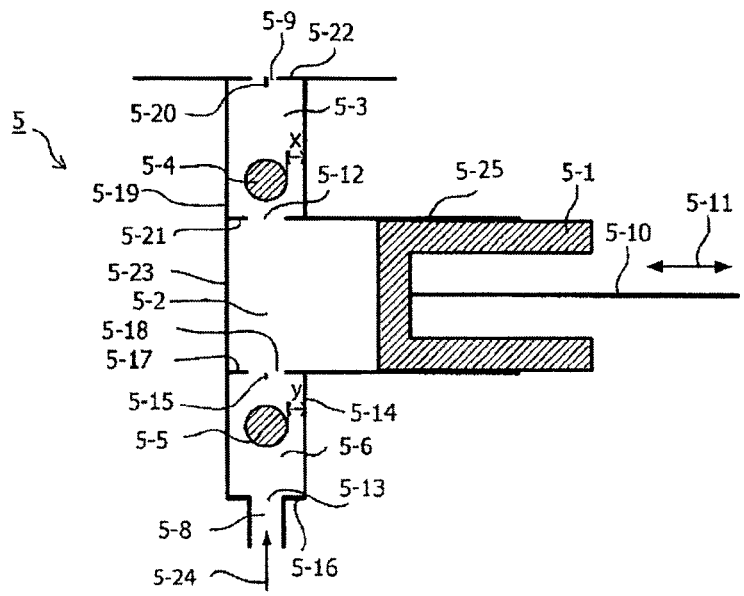
FIGS. 1A and 1B schematically illustrate the cross-section of positive displacement devices for use according to an embodiment of the invention.

Before the present method used in the invention is described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to a method for feeding metallocene catalyst slurry to an olefin polymerization loop reactor (1) using a positive displacement device (5) positive displacement device comprising a first chamber and a second chamber, each chamber having an inlet and an outlet and each chamber comprising an ball arranged between the walls of said chamber, wherein said chambers are connected to each other (e.g. In fluid communication) by a pump chamber, wherein, the difference between the diameter of said ball and the diameter of said chamber is comprised between 5 to 200 times the average particle size (d50) of said catalyst. Said method comprises the steps of comprising the step of activating the pump, thereby:

charging the positive displacement device with catalyst slurry into the pump chamber by aspirating catalyst slurry between the ball and the wall of the first chamber; and discharging the catalyst slurry into the loop reactor by displacing catalyst slurry between the ball and the wall of the second chamber.

In an embodiment, each chamber comprises a top wall, and a bottom wall, connected to each other by a peripheral wall. The bottom wall of each chamber is provided with an opening, herein referred as the inlet of the chamber. The top wall of each chamber is provided with an opening, herein referred as the outlet of the chamber.

Preferably, the inlet of the positive displacement device is connected to a catalyst mixing vessel with a connecting conduit. Preferably, the inlet of the positive displacement device is connected to the inlet of the first chamber, more preferably in the bottom wall of the first chamber. Preferably, the outlet of the positive displacement device is connected to a loop reactor via a catalyst feeding line. Preferably, the outlet of the positive displacement device is located in the second chamber, more preferably the outlet of the positive displacement device is the outlet of the second chamber located in the top wall of said chamber.

In an embodiment, the difference between the diameter of said ball and the diameter of said chamber is comprised between 10 to 200 times the average particle size (d50) of said catalyst. By the term "the difference between the diameter of said ball and the diameter of said chamber" or "diametric clearance" it is meant an intervening space or distance allowing free play, as between machine parts. In the invention it particularly relates to the intervening space between the ball and the chamber containing said ball. In a, embodiment, said difference or diametric clearance is comprised between 10 to 100 times, more preferably between 15 to 50 times, most preferably around 20 times the average particle size (d50) of said catalyst.

In a preferred embodiment, said difference or diametric clearance is at least 1000 μm. In a more preferred embodiment, said diametric clearance is at least 1500 µm, preferably at least 2000 µm, preferably at least 2500 µm, preferably at least 300 µm.

In an embodiment, said first chamber has a cylindrical shape. In an embodiment, the opening in the top wall (the outlet) is partially blocked by way of a barrier. Preferably, the ball remains inside the first chamber. Preferably, the ball in the first chamber has a diameter such that it blocks the inlet of the first chamber, preferably during discharging of the positive displacement device, thereby preventing further backflow. Preferably, the diameter of the ball is larger than the diameter of the inlet of the first chamber. Preferably, the difference between the diameter of said ball and the diameter of said chamber is at least 1000 µm, for example at least 1500 µm, for example at least 2000 µm. Preferably, the barrier in the first chamber prevents the ball from blocking and/or exiting the outlet of the first chamber. Preferably, the diameter of the ball is larger than the space provided by the opening in the top wall and the barrier. Preferably, the ball—when not subject to external forces—moves freely along the first chamber, more preferably inside the peripheral wall of the first chamber.

In an embodiment, said second chamber has a cylindrical shape. In an embodiment, the opening in the top wall (the outlet) of the second chamber is partially blocked by way of a barrier. Preferably, the ball remains inside the second chamber. Preferably, the ball in the second chamber has a diameter such that it blocks the opening in the bottom of the second chamber, preferably during charging of the positive displacement device, thereby preventing further backflow. Preferably, the diameter of the ball of the second chamber is larger than the diameter of the inlet of the second chamber. Preferably, the difference between the diameter of said ball and the diameter of said chamber is at least 1000 µm, for example at least 1500 µm, for example at least 2000 µm. Preferably, the barrier in the second chamber prevents the ball from blocking and/or exiting from the outlet of the second chamber. Preferably, the diameter of the ball is larger than the space provided by the opening in the top wall and the barrier. Preferably, the ball—when not subject to external forces—moves freely in the second chamber, more preferably along the peripheral wall of the second chamber.

A pump chamber is provided between said first chamber and said second chamber. In an embodiment said pump chamber has a bottom wall, corresponding to the top wall of the first chamber and a top wall corresponding to the bottom wall of the second chamber. The pump chamber is thereby in communication with the first and the second chamber through the outlet of said first chamber and the inlet of the second chamber. Preferably, the pump as used in the positive displacement device of the present invention is a piston or a membrane pump, comprising a piston or a membrane actuated by a pump (or actuator) via a shaft connecting said piston/membrane to said pump. In an embodiment, said pump chamber comprise an elongated part, wherein a piston is arranged to move back and forth inside said elongated part, said piston being moveable between a first position in which the piston is displaced in said elongated part and the device is charged with catalyst slurry, and a second position in which the piston is returned to said elongated part of the intermediate chamber and the device discharges the catalyst slurry. In an embodiment, the elongated part is arranged in said pump chamber such that in the first position the piston is inserted in the chamber without blocking the inlet and the outlet of said chamber. Preferably, the piston slidably fits in the elongated part pump chamber.

In another embodiment, said pump chamber comprise a part, wherein a membrane is arranged to move back and forth inside said part, said membrane being moveable between a first position in which the membrane is partly displaced in said part and the device is charged with catalyst slurry, and a second position in which the membrane is returned to said part and the device discharges the catalyst slurry.

The present invention also relates to method of using a positive displacement device as described herein, in particular a positive displacement pump, for supplying metallocene catalyst slurry to an olefin polymerization loop reactor.

Upon activation of the pump of the positive displacement device and increasing the internal volume of the positive displacement device (preferably of the pump chamber), the positive displacement device of the present invention is preferably charged with catalyst slurry. Preferably, catalyst slurry moves through the inlet of the positive displacement device and the opening (outlet) of the first chamber. Preferably, the catalyst slurry passes around the ball in the first chamber, more preferably through a space (y) between the ball and the peripheral wall of the first chamber wherein preferably said a space (y) is of at least 500 µm. Preferably, the catalyst slurry passes through the opening (outlet) in the top wall of the first chamber. Preferably, the catalyst slurry fills the expanding pump chamber.

Preferably, such activation of the pump leads to the ball in the second chamber blocking the inlet of the second chamber. In an embodiment, said ball is blocking said inlet by being sucked toward the inlet upon activation of the pump. According to the invention the difference between the diameter of said ball and the diameter of said chamber is comprised between 5 to 200 times the average particle size (d50) of said catalyst, preferably said difference Upon activation of the pump of the positive displacement device and decreasing the internal volume of the positive displacement device (preferably the pump chamber), the positive displacement device of the present invention preferably discharges the catalyst slurry into the reactor. Preferably, catalyst slurry moves through the opening in the bottom wall (inlet) of the second chamber. Preferably, the catalyst slurry passes the ball in the second chamber, more preferably passes through a space (x) between the ball and the peripheral wall of the second chamber, wherein preferably said a space (x) is of at least 500 µm. Preferably, the catalyst slurry passes through the opening in the top wall (outlet) of the second chamber, thereby being discharged from said device. Preferably, the catalyst slurry moves through the outlet of the second chamber into the polymerization reactor. Preferably, such activation of the pump leads to the ball in the first chamber blocking the inlet of the first chamber. In an embodiment, said ball of the first chamber is blocking said inlet of said first chamber by being pushed by pressure upon activation of the pump.

The present invention is particularly suitable for supplying (feeding) metallocene catalyst, preferably metallocene catalyst slurry, and more preferably diluted catalyst slurry, to a polymerization reactor, the term "catalyst slurry" refers to solid particles of catalyst comprised in a liquid diluent suitable for the polymerization of ethylene. As used herein, the term "slurry" refers to a composition comprising catalyst solid particles and a diluent. The solid particles can be suspended in the diluent, either spontaneously or by homogenization techniques, such as mixing. The solid particles can be non-homogeneously distributed in a diluent and form a sediment or deposit. By the term "solid particles" it is meant a solid provided as a collection of particles, such as for instance a powder or granulate. In the present invention it is especially applicable to a catalyst provided on a carrier or support. The support is preferably a silica (Si) support. As used herein, the "catalyst" refers to a substance that causes a change in the rate of a polymerization reaction without itself being consumed in the reaction. In the present invention it is especially applicable to metallocene catalysts.

The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclo-pentadienyl, indenyl, fluorenyl or their derivatives. Use of metallocene catalysts in the polymerization of polyethylene has various advantages. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

$(Ar)_2MQ_2$      (I); or

$R''(Ar)_2MQ_2$      (II)

wherein the metallocenes according to formula (I) are non-bridged metallocenes and the metallocenes according to formula (II) are bridged metallocenes;
wherein said metallocene according to formula (I) or (II) has two Ar bound to M which can be the same or different from each other;
wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P;
wherein M is a transition metal M selected from the group consisting of titanium, zirconium, hafnium and vanadium; and preferably is zirconium;
wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and
wherein R'' is a divalent group or moiety bridging the two Ar groups and selected from the group consisting of a $C_1$-$C_{20}$ alkylene, a germanium, a silicon, a siloxane, an alkylphosphine and an amine, and wherein said R'' is optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis (indenyl) zirconium dichloride, and bis(n-butyl-cyclopentadienyl) zirconium dichloride; ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride.

The metallocene catalysts are preferably provided on a solid support. The support is preferably an inert solid, organic or inorganic, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. The support is preferably a silica compound. In a preferred embodiment, the metallocene catalyst is provided on a solid support, preferably a silica support, most preferably a porous silica support. According to a preferred embodiment, the invention relates to a metallocene catalyst on a porous silica support. Preferably, the porous silica support has a surface area between 200 and 700 $m^2$/g.

Preferably, the silica support has a pore volume comprised between 0.5 and 3 ml/g. Preferably, the silica support has an average pore diameter comprised between 50 and 300 Angstrom.

In a preferred embodiment, a polymerization catalyst for use with the present device is a supported metallocene-alumoxane catalyst consisting of a metallocene and an alumoxane which are bound on a porous silica support.

Preferably, the metallocene catalyst has a D50 average particle size of at least 30 μm, and preferably at most 100 μm, more preferably at most 70 μm and most preferably at most 50 μm.

Preferably, the catalyst is present with an average particle diameter (D50) between 30 and 50 μm. The D50 is measured by laser diffraction analysis on a Malvern type analyzer after having put the catalyst in suspension in cyclohexane. The D50 is defined as the particle size for which fifty percent by volume of the particles has a size lower than the D50. Malvern systems include the Malvern 2000, Malvern 2600 and Malvern 3600 series.

Preferably, the catalyst is present in a concentration of 0.01 to 50% by weight, more preferably from 0.1 to 10% by weight of the catalyst slurry. Preferably, the remainder of the slurry comprises diluent.

As used herein, the term "diluent" refers to diluents, preferably in liquid form that is in a liquid state, preferably liquid under the conditions in the reactor. Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. No limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

Optionally, activating agent may be added to the reactor. The term "activating agent" refers to materials that can be used in conjunction with a catalyst in order to improve the activity of the catalyst during the polymerization reaction. In the present invention, it particularly refers to an organoaluminium compound, being optionally halogenated, having general formula $AlR^1R^2R^3$ or $AlR^1R^2Y$, wherein $R^1$, $R^2$, $R^3$ is an alkyl having from 1 to 6 carbon atoms and $R^1$, $R^2$, $R^3$ may be the same or different and wherein Y is hydrogen or a halogen, as disclosed in U.S. Pat. No. 6,930,071 and U.S. Pat. No. 6,864,207, which are incorporated herein by reference. Preferred activating agents are Tri-Ethyl Aluminum (TEA), Tri-Iso-Butyl Aluminum (TIBAl), Tri-Methyl Aluminum (TMA), and Methyl-Methyl-Ethyl Aluminum (MMEA). TEAl is particularly preferred.

The present invention is particularly suitable for supplying metallocene catalyst to a polymerization process for preparing polyolefin, and preferably polyethylene, and more preferably for preparing monomodal or bimodal polyethylene. Ethylene polymerizes in a liquid diluent in the presence of the catalyst, optionally an activating agent, optionally a co-monomer, optionally hydrogen and optionally other additives, thereby producing polymerization slurry.

As used herein, the term "polymerization slurry" or "polymer slurry" means substantially a multi-phase composition including at least polymer solids and a liquid phase, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

Suitable ethylene polymerization includes but is not limited to homopolymerization of ethylene, copolymerization of ethylene and a higher 1-olefin co-monomer.

As used herein, the term "co-monomer" refers to olefin co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene.

The term "co-polymer" refers to a polymer, which is made by linking two different types of in the same polymer chain. The term "homo-polymer" refers to a polymer which is made by linking ethylene monomers, in the absence of co-monomers. In an embodiment of the present invention, said co-monomer is 1-hexene.

Preferably, the present method uses at least one positive displacement device, preferably pump for feeding metallocene catalyst slurry to an polymerization loop reactor. Olefin polymerization loop reactors of the present invention, preferably ethylene polymerization loop reactors, comprise a plurality of interconnected pipes, defining a reactor path. The reactor comprises one or more lines for introduction of reactants. Preferably, catalyst, and optionally activation agent, is supplied to the reactor by means of at least one positive displacement device as described in the present method. Preferably polymerization slurry is directionally circulated throughout the loop reactor by one or more pumps, such as an axial flow pump. Preferably, the pump is powered by a motor and comprises a shaft and one or more rotating impellers. Preferably, the reactor is further provided with one or more settling legs, provided with isolation valves that are open under normal conditions and can be closed for example to isolate a settling leg from operation. Preferably, the settling legs are provided with product take off or discharge valves that may be any type of valve that permits continuous or periodical discharge of polymer slurry. Preferably, polymer slurry from the settling legs is moved through one or more product recovery lines to a product recovery zone or for instance to a second loop reactor.

The polymerization can be performed over a wide temperature range. Preferably, the temperature is within the range of about 0° C. to about 110° C. A more preferred range is from about 60° C. to about 100° C., more preferably from about 80 to 110° C., The reactor pressure is preferably held between 20 and 100 bar, 30 to 50 bar, more preferably at pressure of 37 to 45 bar.

Figure 1B:
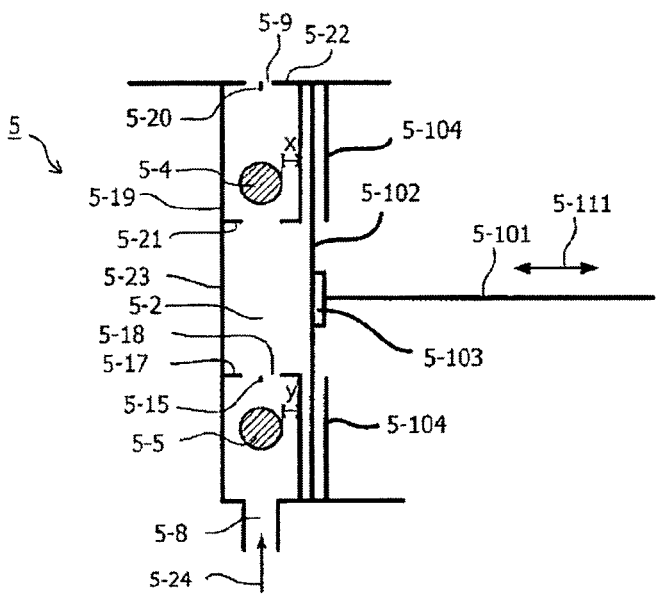
Figure 2:
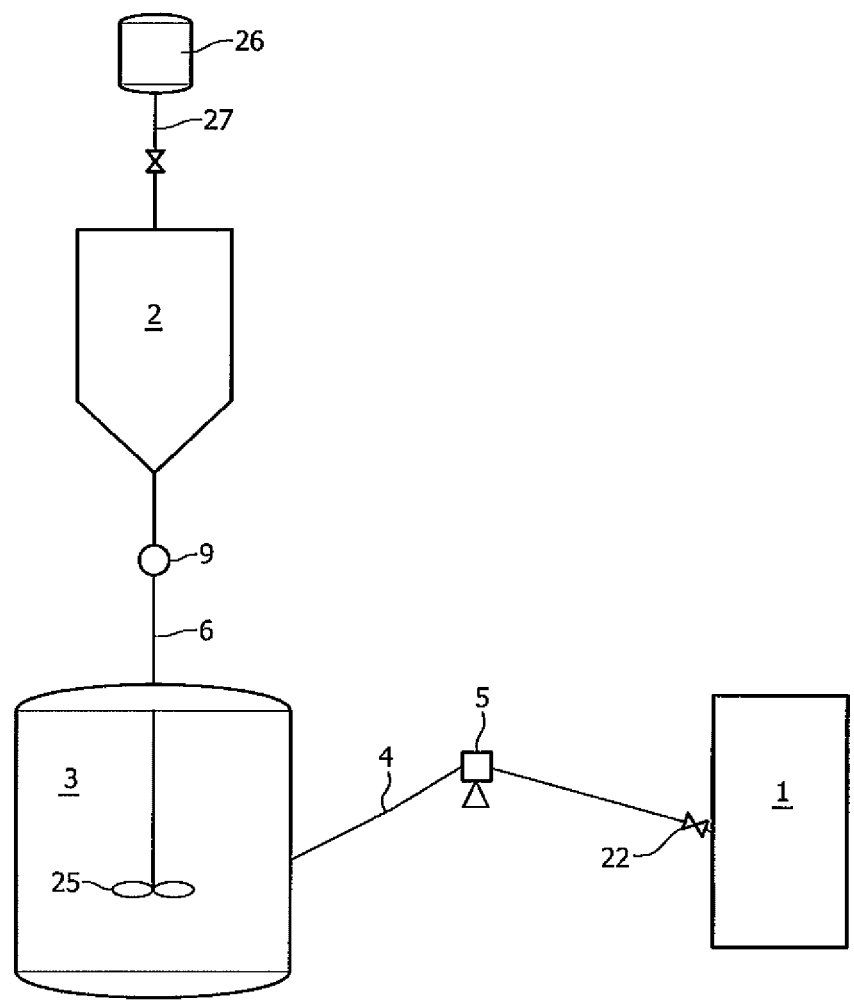
FIG. 2 schematically illustrates an apparatus for controlling the injection of catalyst in a polymerization reactor that may be fitted with a positive displacement device according to an embodiment of the present invention.

The invention can be understood in detail with reference to the embodiments illustrated in FIGS. 1A, 1B, and 2.

FIG. 1A schematically represents the cross sectional section of a positive displacement device according to one embodiment of the invention. The positive displacement device 5 comprises a first chamber 5-6 and a second chamber 5-3, each chamber having an inlet 5-13, 5-12 and an outlet 5-18, 5-9 and each chamber comprising a ball 5-4, 5-5 arranged between the walls 5-14, 5-19 of said chamber, said first and second chambers 5-6, 5-3 are in fluid communication to each other via a pump chamber 5-2 arranged between said first and said second chambers 5-6, 5-3. According to the invention, the design of the chambers and ball is such that the difference between the diameter of each ball 5-5, 5-4 and the diameter of each chamber 5-6, 5-3 is comprised between 5 to 200 times the average particle size (d50) of said metallocene catalyst.

The first chamber 5-6 comprises a top wall 5-17, and a bottom wall 5-16, connected to each other by a peripheral wall 5-14. The bottom wall 5-16 of the first chamber 5-6 is provided with an opening 5-13, herein referred as the inlet 5-13 or inlet port 5-13 of the first chamber 5-6. The top wall 5-17 of the first chamber 5-6 is provided with an opening 5-18, herein referred as the outlet 5-18 or outlet port 5-18 of the first chamber 5-6. In an embodiment, the positive displacement device 5 has a inlet 5-8 connecting said device 5 to a catalyst mixing vessel (not shown). The inlet 5-8 of the positive displacement device 5 is connected to the inlet 5-13 of the first chamber 5-6. The outlet 5-18 in the top wall 5-17 of the first chamber 5-6 is partially blocked by way of a barrier 5-15, thereby preventing the ball 5-5 arranged in said chamber 5-6 to block said outlet 5-18. In an embodiment, the difference between the diameter of said ball 5-5 and the diameter of said first chamber 5-6 is comprised between 5 to 200 times the average particle size (d50) of said catalyst. Preferably, when said devices is in use, the catalyst slurry passes around the ball 5-5 in the first chamber 5-6, through a space (y) between the ball and the peripheral wall of the first chamber wherein preferably said a space (y) is of at least 500 μm.

The second chamber 5-3 comprises a top wall 5-22, and a bottom wall 5-21, connected to each other by a peripheral wall 5-19. The bottom wall 5-21 of the second chamber 5-3 is provided with an opening 5-12, herein referred as the inlet 5-12 or inlet port 5-12 of the second chamber 5-3. The top wall 5-22 of the second chamber 5-3 is provided with an opening 5-9, herein referred as the outlet 5-9 or outlet port 5-9 of the second chamber 5-3. The outlet 5-9 in the top wall 5-22 of the second chamber 5-3 is partially blocked by way of a barrier 5-20, thereby preventing the ball 5-4 arranged in said chamber 5-3 to block said outlet 5-9. In an embodiment the outlet 5-9 of the second chamber 5-3 is connected to a loop reactor via a feeding line (not shown). In an embodiment, the difference between the diameter of said ball 5-4 and the diameter of said second chamber 5-3 is comprised between 5 to 200 times the average particle size (d50) of said catalyst. Preferably, when said devices is in use, the catalyst slurry passes around the ball 5-4 in the second chamber 5-6, through a space (x) between the ball and the peripheral wall of the second chamber wherein preferably said a space (x) is of at least 500 μm.

The piston pump chamber 5-2 is arranged between said first chamber 5-6 and said second chamber 5-3. The pump chamber 5-2 has a bottom wall 5-17, corresponding to the top wall 5-17 of the first chamber 5-6 and a top wall 5-21 corresponding to the bottom wall 5-21 of the second chamber 5-3. The pump chamber 5-2 is thereby in communication with the first 5-6 and the second chamber 5-3 through the outlet 5-18 of said first chamber 5-6 and the inlet 5-12 of the second chamber 5-3. The pump chamber also comprise a peripheral wall 5-23 connected to an elongated hollow part 5-25. A piston 5-1 is arranged in said elongated part 5-25, arranged to move back and forth inside said elongated part 5-25 as indicated by arrows 5-11. The piston 5-1 is connected to a shaft 5-10 operably connected to a pump (not shown).

Piston 5-1 can moves sideways as indicated by arrows 5-11 thereby enlarges and reduces the size of pump chamber 5-2. Upon moving piston 5-1 in the elongated part 5-25 away from wall 5-23 of pump chamber 5-2 and enlarging the internal volume of pump chamber 5-2, catalyst slurry flows from mixing vessel (not shown) and a conduit (not shown) through inlet 5-8 and through opening 5-13 as illustrated by arrow 5-24 into first chamber 5-6. Catalyst slurry will charge the positive displacement device 5 by moving through the space (y) between ball 5-5 and wall 5-14 of first chamber 5-6. Barrier 5-15 prevents ball 5-5 from exiting first chamber 5-6 and/or from blocking opening 5-18 in top 5-17 of first chamber 5-6, allowing ball 5-5 to move freely within wall 5-14 of first chamber 5-6. During that step, the ball 5-4 blocks inlet 5-12 of second chamber 5-3, preventing second chamber 5-3 to discharge its content into the enlarging pump chamber 5-2 or catalyst slurry to enter second chamber 5-3 from pump chamber 5-2. Catalyst slurry moves through opening 5-18 and charges expanding pump chamber 5-2.

Upon moving piston 5-1 in the elongated part 5-25 towards wall 5-23 of pump chamber 5-2 and reducing the internal volume of pump chamber 5-2, catalyst slurry flows from pump chamber 5-2 through inlet 5-12 into second chamber 5-3. Catalyst slurry passes through the space (x) between ball 5-4 and wall 5-19 of second chamber 5-3. Barrier 5-20 prevents ball 5-4 from exiting second chamber 5-3 and/or from blocking opening 5-9 of second chamber 5-3, allowing ball 5-4 to move freely within wall 5-19 of second chamber 5-3. During that step, the ball 5-5 blocks inlet 5-13 of first chamber 5-6, preventing catalyst slurry to enter or leave the positive displacement device through inlet 5-8. Catalyst slurry moves through opening 5-9 of top 5-22 of second chamber 5-3 and is fed into a loop reactor (not shown).

FIG. 1B schematically represents the cross sectional section of a positive displacement device according to another embodiment of the invention. The positive displacement device 5 comprises a first chamber 5-6 and a second chamber 5-3, each chamber having an inlet 5-13, 5-12 and an outlet 5-18, 5-9 and each chamber comprising a ball 5-4, 5-5 arranged between the walls 5-14, 5-19 of said chamber, said first and second chambers 5-6, 5-3 are in fluid communication to each other via a pump chamber 5-2 arranged between said first and said second chambers 5-6, 5-3, said pump chamber being provided with a membrane 5-102. According to the invention, the design of the chambers and ball is such that the difference between the diameter of each ball 5-5, 5-4 and the diameter of each chamber 5-6, 5-3 is comprised between 5 to 200 times the average particle size (d50) of said metallocene catalyst.

The first chamber 5-6 and the second chamber 5-3 are as described in FIG. 1A.

The membrane pump chamber 5-2 is arranged between said first chamber 5-6 and said second chamber 5-3. The pump chamber 5-2 has a bottom wall 5-17, corresponding to the top wall 5-17 of the first chamber 5-6 and a top wall 5-21 corresponding to the bottom wall 5-21 of the second chamber 5-3. The pump chamber 5-2 is thereby in communication with the first 5-6 and the second chamber 5-3 through the outlet 5-18 of said first chamber 5-6 and the inlet 5-12 of the second chamber 5-3. The pump chamber also comprise a peripheral wall 5-23 connected to an hollow part limited by walls 5-104. A membrane 5-102 is arranged in said part, arranged to move back and forth inside the chamber 5-2 as indicated by arrows 5-111. The membrane 5-102 is connected to a shaft 5-101 via a connecting element 103, said shaft 5-101 being operably connected to a pump (not shown).

Membrane 5-102 can moves as indicated by arrows 5-111 thereby enlarges and reduces the size of pump chamber 5-2. Upon membrane 5-102 away from wall 5-23 of pump chamber 5-2 and enlarging the internal volume of pump chamber 5-2, catalyst slurry flows from mixing vessel (not shown) and a conduit (not shown) through inlet 5-8 and through opening 5-13 as illustrated by arrow 5-24 into first chamber 5-6. Catalyst slurry will charge the positive displacement device 5 by moving through the space (y) between ball 5-5 and wall 5-14 of first chamber 5-6. Barrier 5-15 prevents ball 5-5 from exiting first chamber 5-6 and/or from blocking opening 5-18 in top 5-17 of first chamber 5-6, allowing ball 5-5 to move freely within wall 5-14 of first chamber 5-6. During that step, the ball 5-4 blocks inlet 5-12 of second chamber 5-3, preventing second chamber 5-3 to discharge its content into the enlarging pump chamber 5-2 or catalyst slurry to enter second chamber 5-3 from pump chamber 5-2. Catalyst slurry moves through opening 5-18 and charges expanding pump chamber 5-2.

Upon moving membrane 5-102 towards wall 5-23 of pump chamber 5-2 and reducing the internal volume of pump chamber 5-2, catalyst slurry flows from pump chamber 5-2 through inlet 5-12 into second chamber 5-3. Catalyst slurry passes through the space (x) between ball 5-4 and wall 5-19 of second chamber 5-3. Barrier 5-20 prevents ball 5-4 from exiting second chamber 5-3 and/or from blocking opening 5-9 of second chamber 5-3, allowing ball 5-4 to move freely within wall 5-19 of second chamber 5-3. During that step, the ball 5-5 blocks inlet 5-13 of first chamber 5-6, preventing catalyst slurry to enter or leave the positive displacement device through inlet 5-8. Catalyst slurry moves through opening 5-9 of top 5-22 of second chamber 5-3 and is fed into a loop reactor (not shown).

FIG. 2 illustrates an apparatus for controlling the injection of catalyst in a polymerization reactor that may be fitted with a positive displacement device according to an embodiment of the invention. The apparatus comprises one or more catalyst storage vessels 2 (one shown), or so-called mud tank or pot 2 which contain solid-liquid slurry of catalyst and diluent. In an embodiment the apparatus is preferably used for metallocene catalyst.

The catalysts can be provided for examples under a dry form in commercially available drums or tote bins 26. The catalyst is transferred via a valve through line 27 to the storage vessel 2. In general such drums 26 containing dry catalyst powder are not able to handle high pressures. For instance, the pressure in such drum may comprise approximately between 1.1 and 1.5 bar, and preferably 1.3 bar. Depending on the diluent used, it may be required to bring the catalyst under higher pressure conditions in the storage vessel 2. Using appropriate systems, the catalyst is therefore preferably transferred from such drums to a storage vessel 2, which is suitable for handling higher pressures, if this is required by the diluent. This is for instance the case when isobutane is used, since this diluent is only liquid at higher pressure levels. In case for instance hexane is used as diluent, storage vessel 2 is not required, since this diluent is liquid at low pressures. According to a preferred embodiment, a metallocene catalyst is provided from drums 26 to a storage vessel 2 through a conduit 27, preferably by means of nitrogen pneumatic transfer or by gravity. However, it is clear that also other types of catalyst feeding to the storage vessel are suitable and fall within the scope of the present invention. In an alternative embodiment, the catalyst can also be provided in a commercial container that is suitable for handling higher pressure comprised between 7 and 16 bar. In such case such commercial container is considered as a storage vessel 2 and the catalyst can be fed directly from this commercial container to a mixing vessel 3.

The catalyst slurry is transferred by means of conduit 6 from the storage vessels 2 to the mixing vessel 3 wherein said catalyst slurry is diluted for obtaining a suitable concentration for use in a polymerization reaction. The conduit 6 is preferably equipped with metering valve 9 allowing the feeding of a controlled flow rate of catalyst to the mixing vessel 3. The mixing vessel 3 is also provided with a stirrer 25 for maintaining the homogeneity of the slurry.

In addition, the apparatus further comprises one or more conduits 4 which connect the mixing vessel 3 to a polymerization reactor 1 and through which the diluted catalyst slurry is pumped from said mixing vessel 3 to the reactor 1, by means of at least one positive displacement device 5 as described herein provided in these conduits 4. The catalyst can then be supplied to the reactor 1 for example via valve 22. Supplying the catalyst to the polymerization reactor using the positive displacement device of the invention allows for precise and well-controlled dosing over time of abrasive and viscous catalyst slurry. The present positive displacement device has the further advantage of being particularly suited to withhold the pressure difference between the catalyst feeding line and the polymerization reactor.

The invention claimed is:

1. A method for feeding metallocene catalyst slurry to an olefin polymerization loop reactor using a positive displacement device comprising a first chamber and a second chamber, each chamber having an inlet and an outlet and each chamber comprising a ball arranged between walls of said chamber, said chambers being operably connected to each other by a pump chamber, comprising the step of activating the pump, thereby:
   a) charging the positive displacement device with catalyst slurry into the pump chamber by aspirating the catalyst slurry between the ball and the wall of the first chamber; and
   b) discharging the catalyst slurry into the loop reactor by displacing the catalyst slurry between the ball and the wall of the second chamber, wherein, a difference between a diameter of each ball and a diameter of each chamber is between 5 to 200 times an average particle size (d50) of said metallocene catalyst.

2. The method according to claim 1, wherein said average particle size (d50) of said metallocene catalyst is at least 30 μm.

3. The method according to claim 1, wherein said average particle size (d50) of said metallocene catalyst is between 30-50 μm.

4. The method according to claim 1, wherein said difference is at least 1000 μM.

5. The method according to claim 1, wherein said pump is a membrane pump.

6. The method according to claim 1, wherein said pump is a piston pump.

7. The method according to claim 1, wherein the metallocene catalyst is on a porous silica support.

\* \* \* \* \*